United States Patent
Mayle

(10) Patent No.: US 10,560,641 B2
(45) Date of Patent: Feb. 11, 2020

(54) SYSTEMS AND METHODS FOR GENERATING A BIAS FOR A CAMERA SENSOR FOR INCREASING RESOLUTION OF CAPTURED IMAGES

(71) Applicant: Facebook, Inc., Menlo Park, CA (US)

(72) Inventor: Douglas Michael Mayle, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/856,531

(22) Filed: Dec. 28, 2017

(65) Prior Publication Data

US 2019/0208137 A1     Jul. 4, 2019

(51) Int. Cl.
| | |
|---|---|
| *H04N 5/232* | (2006.01) |
| *H04N 5/235* | (2006.01) |
| *H04N 5/265* | (2006.01) |
| *H04N 5/335* | (2011.01) |

(52) U.S. Cl.
CPC ........... *H04N 5/265* (2013.01); *H04N 5/2351* (2013.01); *H04N 5/23251* (2013.01); *H04N 5/335* (2013.01)

(58) Field of Classification Search
None
See application file for complete search history.

(56) References Cited

U.S. PATENT DOCUMENTS

| | | | |
|---|---|---|---|
| 2005/0206346 A1* | 9/2005 | Smith | H02J 7/0047 320/132 |
| 2006/0087561 A1* | 4/2006 | Kojima | H04N 5/23248 348/208.5 |
| 2009/0079876 A1 | 3/2009 | Takeshima | |
| 2012/0051664 A1* | 3/2012 | Gopalakrishnan | G06T 11/005 382/294 |
| 2014/0152838 A1 | 6/2014 | Lee | |
| 2014/0176680 A1 | 6/2014 | DiCarlo | |
| 2014/0232907 A1 | 8/2014 | Endo | |
| 2016/0210525 A1* | 7/2016 | Yang | G06K 9/0063 |
| 2017/0280071 A1 | 9/2017 | Zhou | |

* cited by examiner

*Primary Examiner* — Mark T Monk
(74) *Attorney, Agent, or Firm* — Sheppard Mullin Richter & Hampton LLP

(57) ABSTRACT

Systems, methods, and non-transitory computer readable media can provide a vibrating source configured to cause movement of a camera sensor to generate a bias for the camera sensor. A high frequency accelerometer configured to measure movement of the camera sensor can be provided. A plurality of images of a scene can be captured using the camera sensor based on the generated bias at a resolution supported by the camera sensor, wherein the high frequency accelerometer measures movement of the camera sensor during the capture of the plurality of images.

17 Claims, 9 Drawing Sheets

500

```
Provide a vibrating source configured to cause movement of a camera sensor to
generate a bias for the camera sensor
502
```

↓

```
Provide a high frequency accelerometer configured to measure movement of the
camera sensor
504
```

↓

```
Capture a plurality of images of a scene using the camera sensor based on the
generated bias at a resolution supported by the camera sensor, wherein the
high frequency accelerometer measures movement of the camera sensor during
the capture of the plurality of images
506
```

FIGURE 5

SYSTEMS AND METHODS FOR GENERATING A BIAS FOR A CAMERA SENSOR FOR INCREASING RESOLUTION OF CAPTURED IMAGES

FIELD OF THE INVENTION

The present technology relates to image capture and generation. More particularly, the present technology relates to techniques for increasing resolution of captured images.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user to access. Before publication of a content item, the social networking system can apply processing techniques to the content item for optimal presentation.

SUMMARY

Various embodiments of the present disclosure can include systems, methods, and non-transitory computer readable media configured to obtain information relating to a bias associated with a camera sensor. A plurality of images of a scene captured by the camera sensor can be obtained, where the plurality of images are captured at a resolution supported by the camera sensor. A plurality of weights for each image of the plurality of images can be determined based at least in part on the bias. A combined image of the scene can be generated based on the plurality of images and the determined weights, the combined image having a resolution higher than the resolution supported by the camera sensor.

In some embodiments, the bias provides subpixel image data for a portion of an image captured by the camera sensor.

In certain embodiments, the bias includes one or more of: a directional bias, a random bias, or an average bias.

In an embodiment, the bias is the directional bias and the plurality of images are not aligned, and a location of the bias with respect to the scene moves across the plurality of images.

In some embodiments, the bias is the random bias and the plurality of images are aligned, and each image of the plurality of images includes a random set of pixels captured by the camera sensor.

In certain embodiments, the plurality of weights for each image includes a weight for each pixel of the image.

In an embodiment, the plurality of weights for each image is determined based on a machine learning model.

In some embodiments, for a particular section of the combined image, a weight assigned to a portion of an image of the plurality of images that aligns with the particular section is higher than a weight assigned to a portion of an image of the plurality of images that does not align with the particular section.

In certain embodiments, a weight assigned to a portion of an image of the plurality of images that includes the bias is higher than a weight assigned to a portion of the image that does not include the bias.

In an embodiment, the generating the combined image of the scene includes performing a join on the plurality of images and the corresponding plurality of weights.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Various embodiments of the present disclosure can include systems, methods, and non-transitory computer readable media configured to provide a vibrating source configured to cause movement of a camera sensor to generate a bias for the camera sensor. A high frequency accelerometer configured to measure movement of the camera sensor can be provided. A plurality of images of a scene can be captured using the camera sensor based on the generated bias at a resolution supported by the camera sensor, wherein the high frequency accelerometer measures movement of the camera sensor during the capture of the plurality of images.

In some embodiments, the camera sensor includes one or more of: a charge coupled device (CCD) sensor or a complementary metal oxide semiconductor (CMOS) sensor.

In certain embodiments, the vibrating source is a spindle with a weight that is off center.

In an embodiment, the vibrating source and the high frequency accelerometer are coupled to the camera sensor.

In some embodiments, the generated bias is a directional bias.

In certain embodiments, the bias provides subpixel image data for a portion of an image captured by the camera sensor.

In an embodiment, a combined image having a higher resolution than the resolution supported by the camera sensor is generated based on the plurality of images and weights associated with the plurality of images.

In some embodiments, the weights associated with the plurality of images include a plurality of weights associated with each image of the plurality of images.

In certain embodiments, for a particular section of the combined image, a weight assigned to a portion of an image of the plurality of images that aligns with the particular section is higher than a weight assigned to a portion of an image of the plurality of images that does not align with the particular section.

In an embodiment, a weight assigned to a portion of an image of the plurality of images that includes the bias is higher than a weight assigned to a portion of the image that does not include the bias.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example second method for increasing resolution of captured images, according to an embodiment of the present disclosure.

Figure 1:
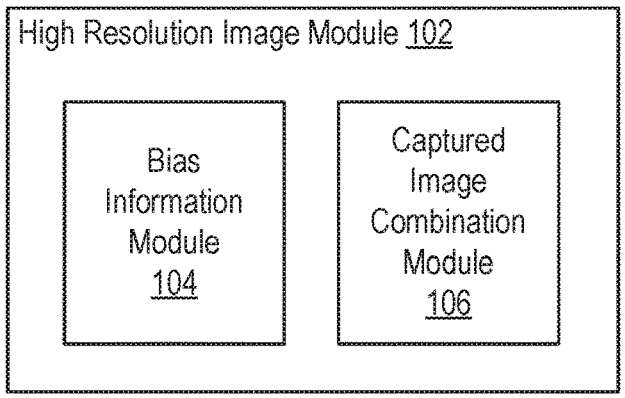
FIG. 1 illustrates an example system including an example high resolution image module configured to increase resolution of captured images, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Increasing Effective Resolution of Images Captured by Camera Sensors

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

Users can upload various types of media content items, such as images and videos, to a social networking system. For example, users can capture images on computing devices using a camera. Under conventional approaches specifically arising in the realm of computer technology, images are captured on a computing device (e.g., a client computing device) at a resolution supported by a camera sensor on the computing device. For example, an image captured on a computing device can be provided at a highest resolution supported by a camera sensor of the computing device, or a resolution that is lower than the highest resolution. Accordingly, the resolution of an image captured on a computing device can be limited by physical properties of a camera sensor on the computing device.

An improved approach rooted in computer technology can overcome the foregoing and other disadvantages associated with conventional approaches specifically arising in the realm of computer technology. Based on computer technology, the disclosed technology can increase resolution of images captured on a computing device by a camera sensor based on multiple captured images and a bias associated with the camera sensor. A camera sensor can have an associated bias. For example, the bias can exist due to or result from physical properties of the camera sensor. The disclosed technology can obtain subpixel image data based on the bias in multiple captured images of a scene. Weights can be determined for each of the multiple captured images of the scene, and the weights can be used to combine the multiple captured images to generate an image that has a higher resolution than a resolution supported by the camera sensor. For example, the weights can be determined based on the bias in the multiple captured images and/or portions of a high resolution image to which the multiple captured images map. In some embodiments, the weights can be determined based on machine learning techniques. In this manner, the disclosed technology can increase an effective resolution of a camera sensor. Additional details relating to the disclosed technology are provided below.

FIG. 1 illustrates an example system 100 including an example high resolution image module 102 configured to increase resolution of captured images, according to an embodiment of the present disclosure. The high resolution image module 102 can include a bias information module 104 and a captured image combination module 106. The example system 100 can also include a computing device 110, such as a client computing device. The computing device 110 can include a bias generation module 112. In some embodiments, the high resolution image module 102 can communicate with the computing device 110. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the high resolution image module 102 can be implemented in any suitable combinations. While the disclosed technology is described in connection with captured images associated with a social networking system for illustrative purposes, the disclosed technology can apply to any other type of system and/or content.

The bias information module 104 can determine or obtain information relating to a bias associated with a camera sensor. A bias associated with a camera sensor can exist due to or result from physical properties of the camera sensor. For example, a camera sensor can have a bias in capturing photons or recording pixels. There can be different types of biases. As an example, the bias can be directional. For instance, the camera sensor can record a pixel in a particular location or region (e.g., upper left, upper right, lower left, lower right, etc.). As another example, the bias can be random, and the camera sensor can record a random subset of pixels. As an additional example, the bias can be an average of pixels. The bias associated with a camera sensor can vary depending on the camera sensor. The bias determination module 104 can determine or obtain information on what type of bias is associated with a particular camera sensor. The type of bias associated with the camera sensor can be used in combining multiple images captured by the camera sensor, as described below. In some embodiments, a bias can represent information about a subsampling (e.g., ordered, random, etc.) of a low resolution image. For example, a low resolution image can be an image captured by a camera sensor. Knowledge of how the bias correspond to the subsampling can allow generation of a higher resolution image based on one or more low resolution images. For example, weights associated with one or more low resolution images may indicate how the bias corresponds to the subsampling.

In some embodiments, a bias can be generated for a camera sensor based on hardware components that are external to the camera sensor. For example, the generated bias can be different from a bias associated with a camera sensor. In these embodiments, the bias determination module 104 can determine or obtain information relating to the generated bias. In certain embodiments, a bias can be generated by the bias generation module 112, as described below. All examples herein are provided for illustrative purposes, and there can be many variations and other possibilities.

The captured image combination module 106 can generate high resolution images from captured images. Multiple images of a scene captured by a camera sensor at a resolution supported by the camera sensor can be obtained. The captured image combination module 106 can determine weights associated with the multiple captured images to be used in combining the multiple captured images to generate a high resolution image. A high resolution image can be generated based on the multiple captured images and the corresponding weights for the multiple captured images. Functionality of the captured image combination module 106 is described in more detail herein.

The bias generation module 112 can generate a bias associated with a camera sensor. In some embodiments, a bias can be generated for a camera sensor based on hardware components. For example, the generated bias can be a bias that is separate from a bias associated with a camera sensor. The bias generation module 112 can reside on the computing device 110. The computing device 110 can be a client computing device, such as a user device 610 in FIG. 6. Functionality of the bias generation module 112 is described in more detail herein.

In some embodiments, the high resolution image module 102 and/or the bias generation module 112 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the high resolution image module 102 and/or the bias generation module 112 can be, in part or in whole, implemented as software running on one or more computing devices or systems, such as on a server system or a client computing device. In some instances, the high resolution image module 102 and/or the bias generation module 112 can be, in part or in whole, implemented within or configured to operate in conjunction or be integrated with a social networking system (or service), such as a social networking system 630 of FIG. 6. Likewise, in some instances, the high resolution image module 102 and/or the bias generation module 112 can be, in part or in whole, implemented within or configured to operate in conjunction or be integrated with a client computing device, such as the user device 610 of FIG. 6. For example, the high resolution image module 102 and/or the bias generation module 112 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the high resolution image module 102 and/or the bias generation module 112. The data maintained by the data store 120 can include, for example, information relating to camera sensors, biases, captured images, weights associated with captured images, high resolution images generated from captured images, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the high resolution image module 102 can be configured to communicate and/or operate with the data store 120. In some embodiments, the bias generation module 112 can also be configured to communicate and/or operate with the data store 120. In some embodiments, the data store 120 can be a data store within a client computing device. In some embodiments, the data store 120 can be a data store of a server system in communication with the client computing device.

Figure 2A:
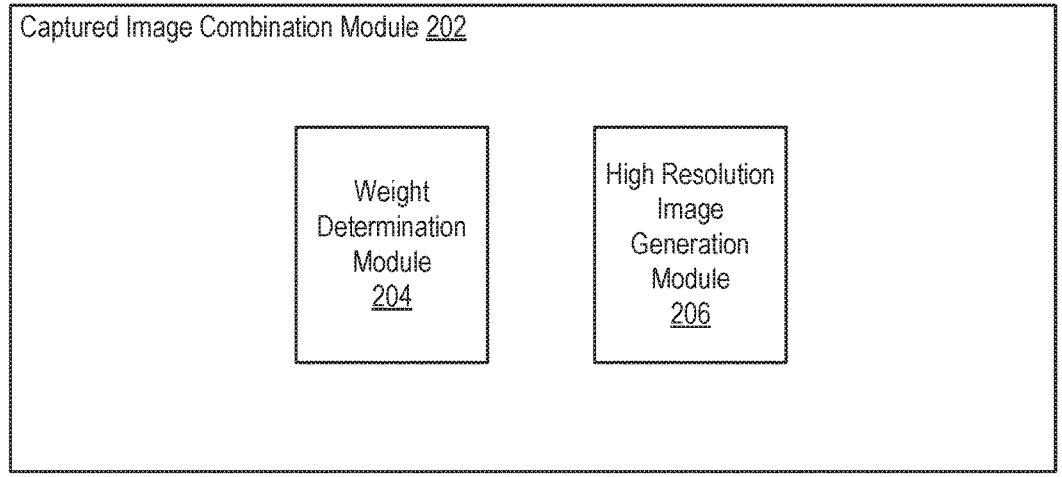
FIG. 2A illustrates an example captured image combination module configured to generate high resolution images from captured images, according to an embodiment of the present disclosure.

FIG. 2A illustrates an example captured image combination module 202 configured to generate high resolution images from captured images, according to an embodiment of the present disclosure. In some embodiments, the captured image combination module 106 of FIG. 1 can be implemented with the example captured image combination module 202. As shown in the example of FIG. 2A, the example captured image combination module 202 can include a weight determination module 204 and a high resolution image generation module 206.

The captured image combination module 202 can obtain multiple images of a scene captured by a camera sensor at a resolution supported by the camera sensor. For example, a resolution supported by the camera sensor can be a pixel resolution of the camera sensor. A resolution supported by the camera sensor can be referred to as a "camera sensor resolution" or "low resolution," as discussed herein. Images captured by the camera sensor at a resolution supported by the camera sensor can be referred to as "camera sensor resolution images" or "low resolution images." The multiple captured images of the scene can be combined to generate a combined image of the scene that has a higher resolution than the multiple captured images. In some embodiments, the higher resolution combined image of the scene generated from the multiple captured images of the scene can be referred to as the "high resolution image."

Each captured image of multiple captured images of a scene can depict a specific portion of the scene. The multiple captured images can be combined to generate a high resolution image. In some instances, the location or position of a camera sensor may move with respect to a scene as multiple captured images of the scene are generated such that not all of the multiple captured images capture the same portion of the scene. In these instances, the multiple captured images are not aligned. To align the multiple captured images so that their combination coherently depicts the scene, each captured image can be translated based on the portion of the scene depicted in the captured image to map to a corresponding portion of the scene depicted in the high resolution image. In other instances, the location or position of the camera sensor may stay constant with respect to a scene as multiple captured images of the scene are generated. In these instances, the multiple captured images are aligned, and each captured image can map to the high resolution image without a need for translation.

In some embodiments, the high resolution image can be represented as a grid of pixels, which can be referred to as a "high resolution image pixel grid." The high resolution image pixel grid can have a higher resolution than a resolution supported by the camera sensor. For example, the high resolution image pixel grid can be a virtual grid that has a higher number of pixels than a number of pixels of the camera sensor or a number of pixels in the multiple captured images. Accordingly, a pixel in a captured image can map to more than one pixel in the high resolution image. Weights can be determined for each captured image, and the multiple captured images can be combined based on the respective weights to generate the high resolution image.

A bias associated with a camera sensor can be used to obtain subpixel image data for a scene. Subpixel image data can refer to image data at a higher resolution than a resolution supported by the camera sensor (e.g., a pixel resolution of the camera sensor). The bias can provide subpixel image data in a captured image. In an example, if the bias is directional (e.g., towards upper left), the bias can provide subpixel image data in a particular region of a captured image (e.g., towards upper left). If the camera sensor is moved slightly each time an image of the scene is captured, a portion of the scene depicted can change across different captured images, and the location of the bias with respect to the scene can also move in the different captured images. For example, the bias may move consistently with respect to the scene across the different captured images. Accordingly, multiple captured images can provide subpixel image data for different parts of the scene over time. In this example, the multiple captured images of the scene may not be aligned perfectly since the camera sensor moves over time. In another example, if the bias is random, the camera sensor can record a random set of pixels for a captured image. Accordingly, the location of the bias can also move over time in different captured images. In this example, the bias can provide subpixel image data for different parts of a scene even though the camera sensor is not moved since random pixels are recorded. Therefore, in this example, the multiple captured images of the scene could be aligned. The bias in each captured image can be used to determine weights associated with each captured image that can be used in combining multiple captured images.

The weight determination module 204 can determine weights associated with multiple captured images to be used in combining the multiple captured images to generate a high resolution image. Weights associated with multiple captured images can be determined based on the bias associated with the camera sensor and/or to which portions of a high resolution image the multiple captured images map. The weight determination module 204 can determine weights for each of multiple captured images. For example, the weight determination module 204 can determine a set of weights associated with each captured image. For instance, there can be a weight for each pixel of a captured image. A weight associated with a pixel can indicate importance of a pixel in a first captured image compared to a pixel in a second captured image in generating a high resolution image. For instance, the weight associated with the pixel in the first captured image and the weight associated with the pixel in the second captured image can indicate respective importance of the pixels in determining the value of one or more corresponding pixels in the high resolution image. In some cases, a weight associated with a pixel can also indicate importance of a first pixel in a captured image compared to a second pixel in the same captured image in generating a high resolution image. For instance, weights can vary for different pixels within the same captured image. In some embodiments, there can be multiple sets of weights and/or levels of weights for each captured image.

The weights for each captured image can be used in combining multiple captured images to generate a combined high resolution image. For example, if the bias is a directional bias (e.g., toward upper left) and multiple captured images are not aligned, each captured image can depict a different portion of a scene. As described above, the multiple captured images can be translated and mapped to a corresponding portion of the scene in a high resolution image. Weights for each captured image can be determined based on how the captured image maps to the high resolution image. For instance, a captured image that aligns with a particular section of the high resolution image can be weighted more highly than a captured image that does not align with that particular section. A captured image may align with the particular section of the high resolution image if a portion of the scene depicted in the captured image perfectly maps to or aligns with a portion of the scene depicted in the particular section of the high resolution image. In addition, a portion of a captured image where the bias is located can be weighted more highly than the rest of the captured image. For instance, a portion of a captured image that provides subpixel image data for a particular section of the high resolution image can be weighted more highly than a portion of the captured image or a portion of another captured image that does not provide subpixel image data for the particular section of the high resolution image. For a directional bias, a set of simple or nonrandom weights may be used in some embodiments. As another example, if the bias is a random bias, multiple captured images may be aligned, and each captured image can be mapped to a high resolution image without being translated. A portion of a captured image where the bias is located can be weighted more highly than the rest of the captured image. For a random bias, more random weights can be used. In some embodiments, the weights can be determined and tuned manually.

In some embodiments, the weight determination module 204 can determine weights associated with a captured image based on machine learning techniques. For example, a machine learning model can be trained based on training data including multiple captured images of scenes, corresponding high resolution images of scenes, and/or bias. The trained machine learning model can predict weights for a particular set of multiple captured images. In some embodiments, the machine learning model can be trained to determine a bias associated with a camera sensor that captured multiple captured images and predict weights for the multiple captured images based on the bias. In some embodiments, the machine learning model can be a neural network. In some embodiments, a machine learning model can be trained for a particular camera sensor. Accordingly, there can be multiple machine learning models, each trained for a particular camera sensor. One or more machine learning models discussed in connection with the high resolution image module 102 and its components can be implemented separately or in combination, for example, as a single machine learning model, as multiple machine learning models, as one or more staged machine learning models, as one or more combined machine learning models, etc.

The high resolution image generation module 206 can generate a high resolution image based on multiple captured images and corresponding weights for the multiple captured images. In an example, each captured image can have a set of weights associated with the image, and a pairwise join can be performed on each captured image and the set of weights. The multiple captured images can be combined to generate a combined high resolution image. A type of join and/or other operations performed to generate a high resolution image can vary depending on the camera sensor and/or the bias. For example, a join and/or other operations performed can be adapted for a particular camera sensor.

In this manner, the disclosed technology can obtain subpixel image data based on multiple captured images of a scene and a bias associated with a camera sensor used to capture the images of the scene, and generate a combined high resolution image. The disclosed technology can thus generate images that have a resolution that exceeds physical limits of the camera sensor and can improve an effective resolution of the camera sensor. The disclosed technology can have various applications. As an example, the disclosed technology can be used in connection with satellites. When a satellite having a camera sensor is above a certain height from a surface, it can be difficult to capture high quality images of the surface using a resolution supported by the camera sensor, and the disclosed technology can be used to improve the effective resolution of the camera sensor. For example, a combined high resolution image can be generated based on multiple captured images of the surface. Generating the combined high resolution image can be performed based on computing or processing resources, such as central processing units (CPUs), without having to add camera sensors that support higher resolutions. All examples herein are provided for illustrative purposes, and there can be many variations and other possibilities.

Figure 2B:
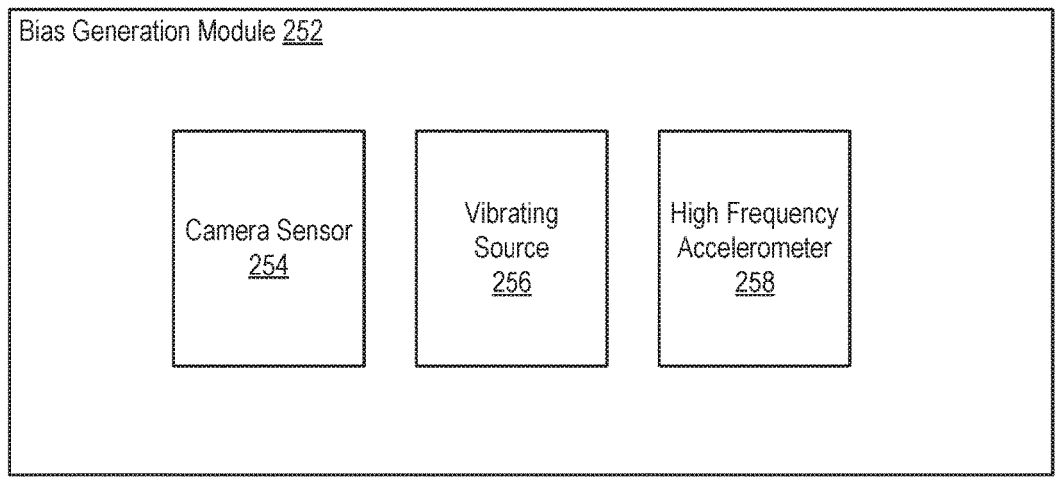
FIG. 2B illustrates an example bias generation module configured to generate a bias associated with a camera sensor, according to an embodiment of the present disclosure.

FIG. 2B illustrates an example bias generation module 252 configured to generate a bias associated with a camera sensor, according to an embodiment of the present disclosure. In some embodiments, the bias generation module 112 of FIG. 1 can be implemented with the example bias generation module 252. As shown in the example of FIG. 2B, the example bias generation module 252 can include a camera sensor 254, a vibrating source 256, and a high frequency accelerometer 258. The bias generation module 252 can reside on a computing device of a user, such as a camera or a mobile phone. The vibrating source 256 and the high frequency accelerometer 258 can be connected or paired with the camera sensor 254. In some cases, a bias associated with a camera sensor may not be known, and the bias generation module 252 can introduce a bias for the camera sensor in order to generate subpixel image data.

The camera sensor 254 can capture images of a scene. For example, photons can pass through a lens, and the camera sensor 254 can capture the photons to generate images at a resolution supported by the camera sensor 254. In some embodiments, the camera sensor 254 can be a charge coupled device (CCD) sensor. In other embodiments, the camera sensor 254 can be a complementary metal oxide semiconductor (CMOS) sensor. Many variations are possible.

The vibrating source 256 can generate movement of the camera sensor 254 in order to generate the bias. As an example, the vibrating source 256 can introduce a directional bias for the camera sensor 254. The vibrating source 256 can introduce a slight movement in the camera sensor 254 such that each image of a scene captured by the camera sensor 254 depicts a different portion of the scene. The vibrating source 256 can introduce a subpixel movement such that the camera sensor 254 is moved by a subpixel distance. For instance, subpixel image data can be generated if a distance the camera sensor 254 is moved is less than the size of a pixel of the camera sensor 254. In some embodiments, the vibrating source 256 can be a weight on a spindle that is off center. Many variations are possible.

The high frequency accelerometer 258 can measure movement of the camera sensor 254 due to movement generated by the vibrating source 256. For instance, the high frequency accelerometer 258 can measure a distance or extent and/or a direction of a movement. As an example, the high frequency accelerometer 258 can measure a location or a movement of the camera sensor 254 on an order of a thousand times per second. Many variations are possible.

The bias generation module 112 can determine the generated bias introduced by the vibrating source 256 based on measurements by the high frequency accelerometer 258. Images capturing a scene with the generated bias can include a directional bias, and the directional bias can be used in generating a high resolution image from multiple captured images, as described above in connection with the high resolution image module 102. In this manner, the bias generation module 112 can be used in connection with the high resolution image module 102. All examples herein are provided for illustrative purposes, and there can be many variations and other possibilities.

Figure 3A:
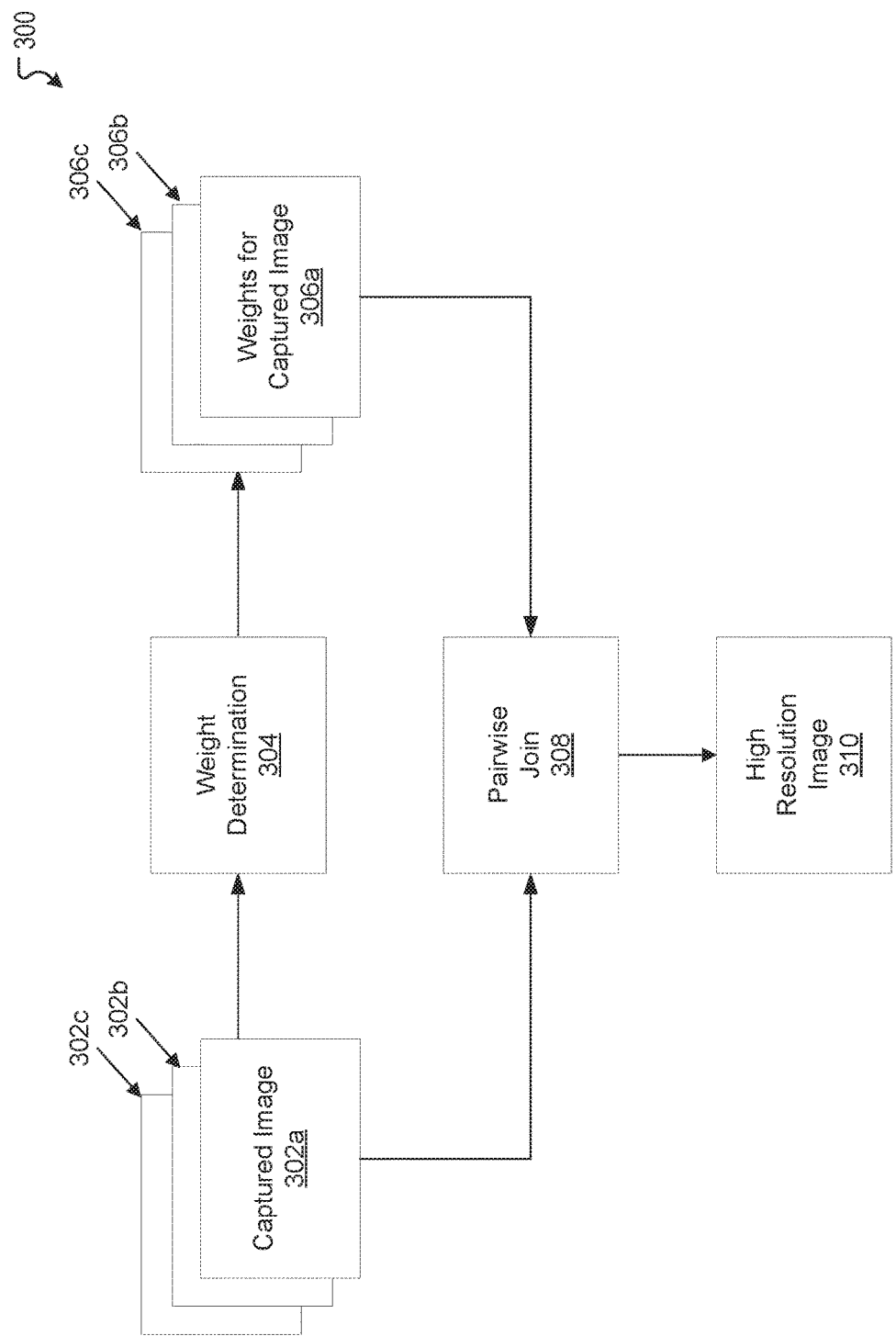
FIG. 3A illustrates a functional block diagram for increasing resolution of captured images, according to an embodiment of the present disclosure.

FIG. 3A illustrates a functional block diagram 300 for increasing resolution of captured images, according to an embodiment of the present disclosure. Captured images 302a, 302b, 302c can be multiple images of a scene captured by a camera sensor. The captured images 302a, 302b, 302c can each include a bias associated with the camera sensor. At block 304, weights can be determined for the captured images 302a, 302b, 302c. For example, weights can be determined as described above in connection with the high resolution image module 102. Weights for captured image 306a can be weights associated with the captured image 302a; weights for captured image 306b can be weights associated with the captured image 302b; and weights for captured image 306c can be weights associated with the captured image 302c. Weights for a captured image can include a weight for each pixel of the captured image. At block 306, an operation to match a captured image and its associated weights, such as a pairwise join, can be performed on the captured images 302a, 302b, 302c and, respectively, the corresponding weights 306a, 306b, 306c. A high resolution image 310 can be generated from the captured images 302, 302b, 302c that have been weighted by the corresponding weights 306a, 306b, 306c. All examples herein are provided for illustrative purposes, and there can be many variations and other possibilities.

Figure 3B:
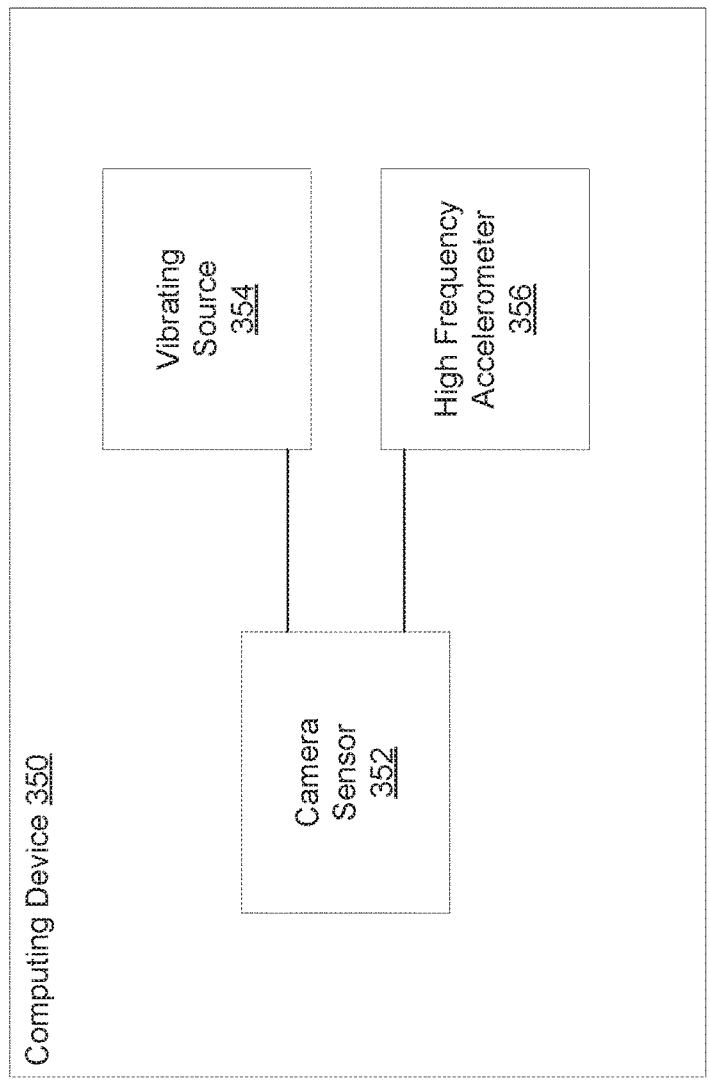
FIG. 3B illustrates an example computing device for generating a bias associated with a camera sensor, according to an embodiment of the present disclosure.

FIG. 3B illustrates an example computing device 350 for generating a bias associated with a camera sensor, according to an embodiment of the present disclosure. The computing device 350 can include a camera sensor 352, a vibrating source 354, and a high frequency accelerometer 356. For example, the vibrating source 354 and the high frequency accelerometer 356 can be connected to the camera sensor 352. In some embodiments, the camera sensor 352, the vibrating source 354, and the high frequency accelerometer 356 can be implemented with the example bias generation module 112, 252, as discussed herein. The vibrating source 354 can introduce a bias to the camera sensor 354, and the high frequency accelerometer 356 can measure the introduced bias. Multiple images of a scene captured by the camera sensor 352 with the introduced bias can be used to generate a high resolution image, for example, as described in connection with the high resolution image module 102. All examples herein are provided for illustrative purposes, and there can be many variations and other possibilities.

Figure 4:
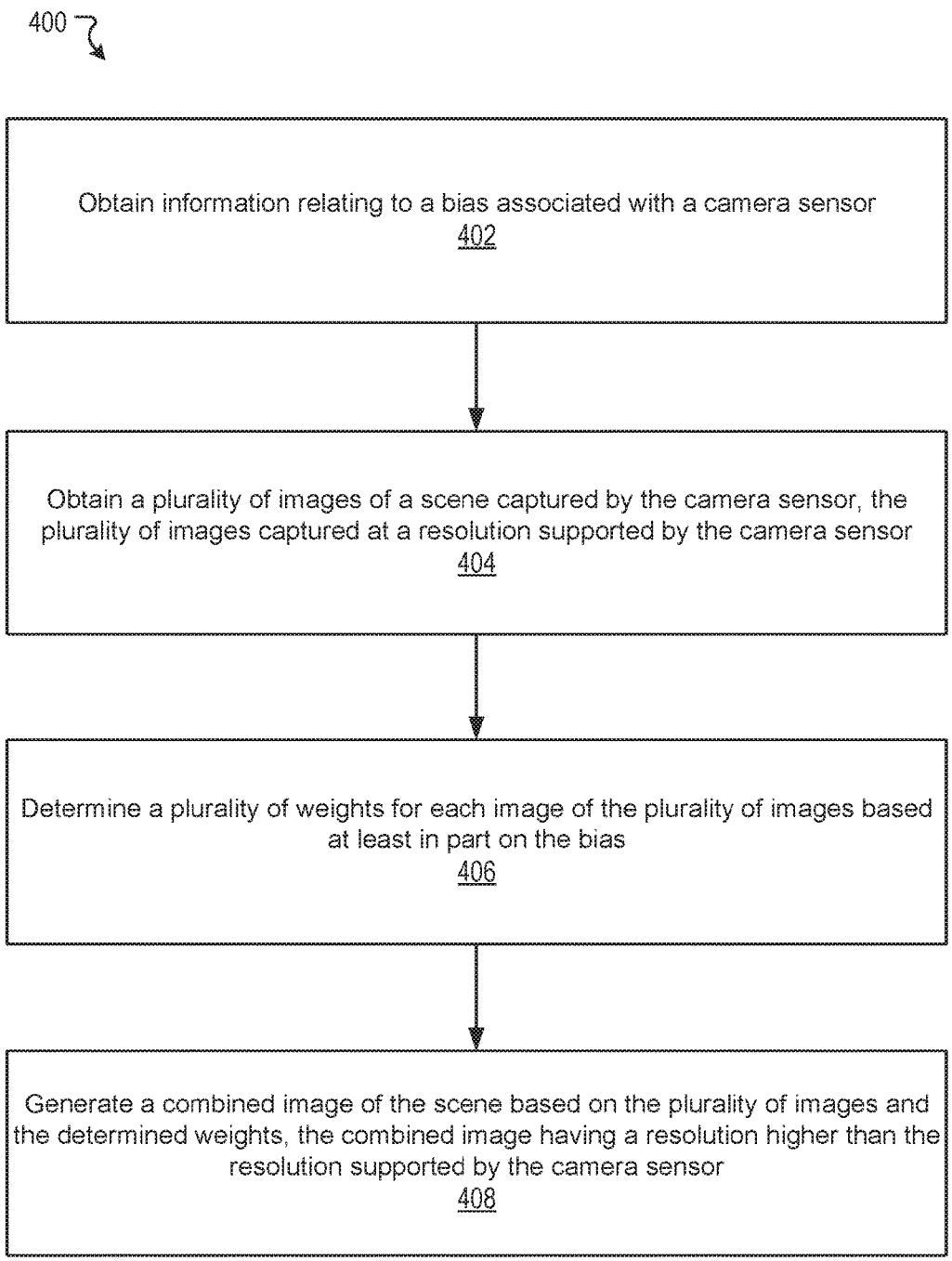
FIG. 4 illustrates an example first method for increasing resolution of captured images, according to an embodiment of the present disclosure.

FIG. 4 illustrates an example first method 400 for increasing resolution of captured images, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain information relating to a bias associated with a camera sensor. At block 404, the example method 400 can obtain a plurality of images of a scene captured by the camera sensor, the plurality of images captured at a resolution supported by the camera sensor. At block 406, the example method 400 can determine a plurality of weights for each image of the plurality of images based at least in part on the bias. At block 408, the example method 400 can generate a combined image of the scene based on the plurality of images and the determined weights, the combined image having a resolution higher than the resolution supported by the camera sensor. Other suitable techniques that incorporate various features and embodiments of the present disclosure are possible.

FIG. 5 illustrates an example second method 500 for increasing resolution of captured images, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can provide a vibrating source configured to cause movement of a camera sensor to generate a bias for the camera sensor. At block 504, the example method 500 can provide a high frequency accelerometer configured to measure movement of the camera sensor. At block 506, the example method 500 can capture a plurality of images of a scene using the camera sensor based on the generated bias at a resolution supported by the camera sensor, wherein the high frequency accelerometer measures movement of the camera sensor during the capture of the plurality of images. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
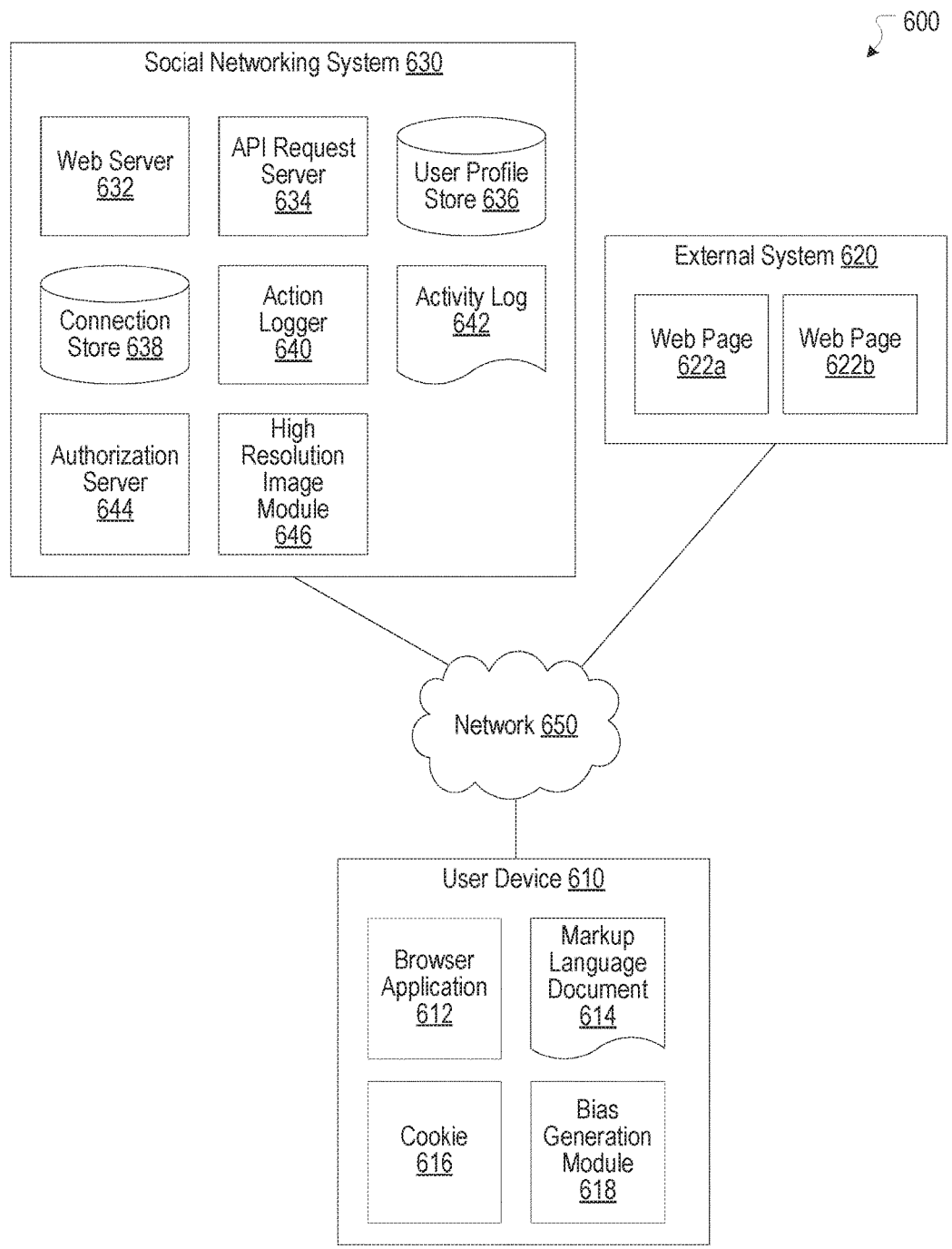
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a high resolution image module 646. The high resolution image module 646 can be implemented with the high resolution image module 102, as discussed in more detail herein. In some embodiments, one or more functionalities of the high resolution image module 646 can be implemented in the user device 610.

In some embodiments, the user device 610 can include a bias generation module 618. The bias generation module 618 can be implemented with the bias generation module 112, as discussed in more detail herein. In some embodiments, one or more functionalities of the bias generation module 618 can be implemented in the social networking system 630.

Hardware Implementation

Figure 7:
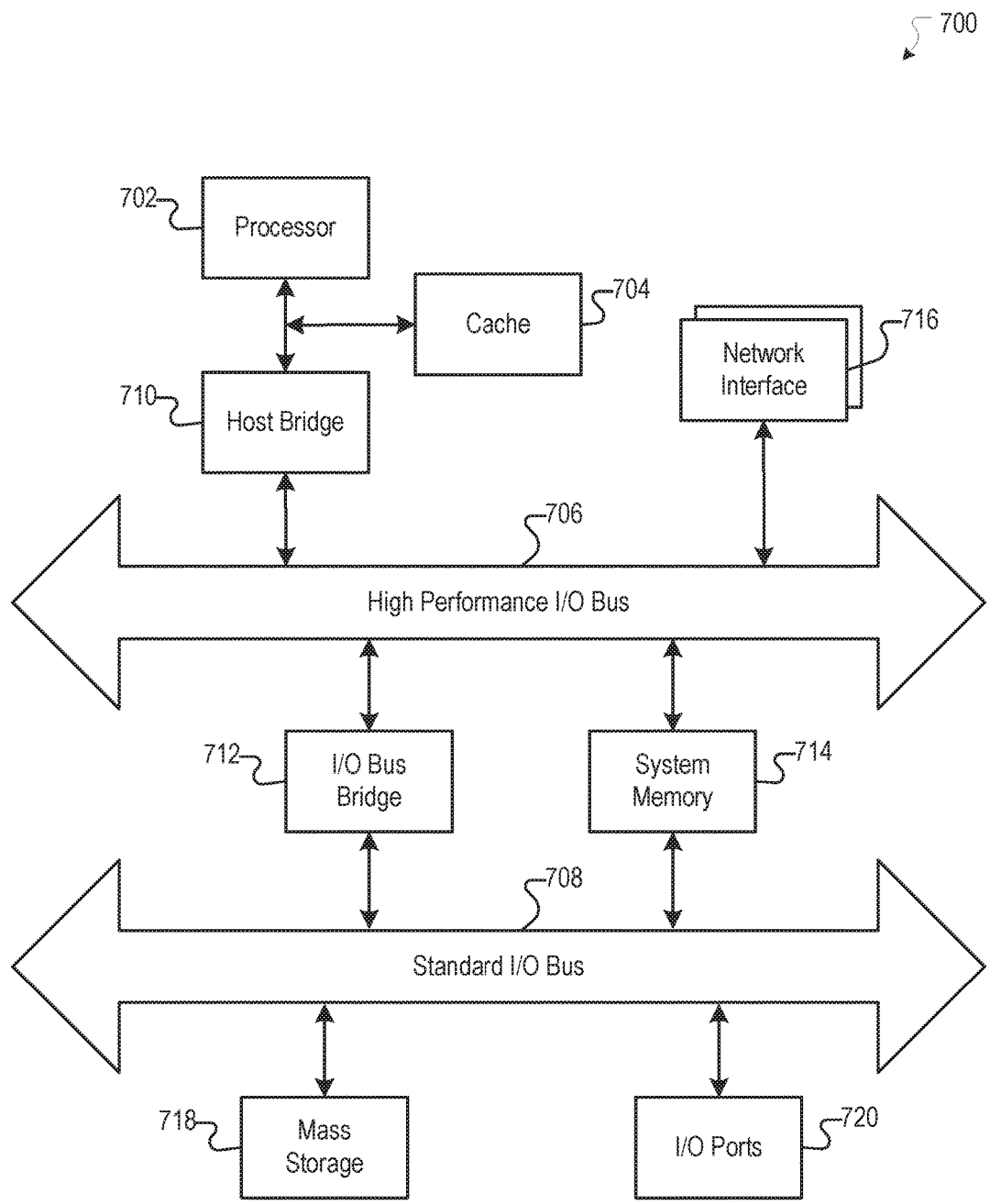
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium.

Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
   a camera sensor of a camera configured to capture images;
   a vibrating source, located in the camera, configured to generate movement of the camera sensor to generate a bias for the camera sensor; and
   a high frequency accelerometer configured to measure movement of the camera sensor,
   wherein the camera sensor captures a plurality of images of a scene based on the generated bias at a resolution supported by the camera sensor, wherein the vibrating source and the high frequency accelerometer are coupled to the camera sensor, and wherein the high frequency accelerometer measures movement of the camera sensor generated by the vibrating source during the capture of the plurality of images.

2. The system of claim 1, wherein the camera sensor includes one or more of: a charge coupled device (CCD) sensor or a complementary metal oxide semiconductor (CMOS) sensor.

3. The system of claim 1, wherein the vibrating source is a spindle with a weight that is off center.

4. The system of claim 1, wherein the generated bias is a directional bias.

5. The system of claim 1, wherein the bias provides subpixel image data for a portion of an image captured by the camera sensor.

6. The system of claim 1, wherein a combined image having a higher resolution than the resolution supported by the camera sensor is generated based on the plurality of images and weights associated with the plurality of images.

7. The system of claim 6, wherein the weights associated with the plurality of images include a plurality of weights associated with each image of the plurality of images.

8. The system of claim 7, wherein, for a particular section of the combined image, a weight assigned to a portion of an image of the plurality of images that aligns with the particular section is higher than a weight assigned to a portion of an image of the plurality of images that does not align with the particular section.

9. The system of claim 7, wherein a weight assigned to a portion of an image of the plurality of images that includes the bias is higher than a weight assigned to a portion of the image that does not include the bias.

10. A computer-implemented method comprising:
    providing a vibrating source configured to generate movement of a camera sensor of a camera to generate a bias for the camera sensor, wherein the vibrating source is located in the camera;
    providing a high frequency accelerometer configured to measure movement of the camera sensor; and
    capturing a plurality of images of a scene using the camera sensor based on the generated bias at a resolution supported by the camera sensor, wherein the vibrating source and the high frequency accelerometer are coupled to the camera sensor, wherein the high frequency accelerometer measures movement of the camera sensor generated by the vibrating source during the capture of the plurality of images.

11. The computer-implemented method of claim 10, wherein the camera sensor includes one or more of: a charge coupled device (CCD) sensor or a complementary metal oxide semiconductor (CMOS) sensor.

12. The computer-implemented method of claim 10, wherein the vibrating source is a spindle with a weight that is off center.

13. The computer-implemented method of claim 10, wherein the generated bias is a directional bias.

14. A non-transitory computer readable medium including instructions that, when executed by at least one hardware processor of a computing system, cause the computing system to perform a method comprising:

generating movement of a camera sensor of a camera by a vibrating source located in the camera to generate a bias for the camera sensor;

measuring movement of the camera sensor by a high frequency accelerometer; and capturing a plurality of images of a scene using the camera sensor based on the generated bias at a resolution supported by the camera sensor, wherein the vibrating source and the high frequency accelerometer are coupled to the camera sensor, wherein the high frequency accelerometer measures movement of the camera generated by the vibrating source sensor during the capture of the plurality of images.

15. The non-transitory computer readable medium of claim 14, wherein the camera sensor includes one or more of: a charge coupled device (CCD) sensor or a complementary metal oxide semiconductor (CMOS) sensor.

16. The non-transitory computer readable medium of claim 14, wherein the vibrating source is a spindle with a weight that is off center.

17. The non-transitory computer readable medium of claim 14, wherein the generated bias is a directional bias.

\* \* \* \* \*